US011088414B2

(12) United States Patent
Yang et al.

(10) Patent No.: US 11,088,414 B2
(45) Date of Patent: Aug. 10, 2021

(54) BATTERY HOUSING APPARATUS AND UNMANNED AERIAL VEHICLE

(71) Applicant: SZ DJI TECHNOLOGY CO., LTD., Shenzhen (CN)

(72) Inventors: Feihu Yang, Shenzhen (CN); Fangming Ye, Shenzhen (CN); Di Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 92 days.

(21) Appl. No.: 16/397,555

(22) Filed: Apr. 29, 2019

(65) Prior Publication Data

US 2019/0259998 A1   Aug. 22, 2019

Related U.S. Application Data

(63) Continuation of application No. PCT/CN2016/104368, filed on Nov. 2, 2016.

(51) Int. Cl.
| | |
|---|---|
| *H01M 50/20* | (2021.01) |
| *B64D 27/24* | (2006.01) |
| *B64D 27/26* | (2006.01) |
| *B64C 39/02* | (2006.01) |

(52) U.S. Cl.
CPC .......... *H01M 50/20* (2021.01); *B64C 39/024* (2013.01); *B64D 27/24* (2013.01); *B64D 27/26* (2013.01); *B64C 2201/042* (2013.01); *H01M 2220/20* (2013.01)

(58) Field of Classification Search
CPC .... H01M 2/1083; B64C 39/024; B64D 27/24; B64D 27/26

USPC .......................................................... 429/99
See application file for complete search history.

(56) References Cited

U.S. PATENT DOCUMENTS

| | | | |
|---|---|---|---|
| 2006/0012332 A1* | 1/2006 | Peng | H04M 1/0262 320/107 |
| 2007/0048599 A1* | 3/2007 | Choi | H01M 2/1066 429/97 |
| 2010/0112422 A1* | 5/2010 | Wang | G06F 1/1635 429/96 |

(Continued)

FOREIGN PATENT DOCUMENTS

| | | |
|---|---|---|
| CN | 1464508 A | 12/2003 |
| CN | 1627769 A | 6/2005 |
| CN | 1992384 A | 7/2007 |

(Continued)

OTHER PUBLICATIONS

World Intellectual Property Organization (WIPO) International Search Report for PCT/CN2016/104368 dated Aug. 7, 2017 6 Pages.
English Translation of CN205376593U. Accessed on Oct. 28, 2019.

*Primary Examiner* — Sean P Cullen
(74) *Attorney, Agent, or Firm* — Anova Law Group, PLLC

(57) ABSTRACT

The present disclosure discloses a battery housing apparatus. The apparatus includes a housing body and a battery locking mechanism. The housing body is configured with at least one battery compartment for housing a battery. The battery locking mechanism is disposed on the housing body and configured to indicate whether the battery is mounted in place during a process of mounting the battery in the battery compartment and to lock the battery in the battery compartment after the battery is mounted in place.

18 Claims, 10 Drawing Sheets

(56) References Cited

U.S. PATENT DOCUMENTS

2019/0252654 A1\* 8/2019 Ye .................. H01M 2/1072

FOREIGN PATENT DOCUMENTS

| | | | |
|---|---|---|---|
| CN | 101232083 A | 7/2008 | |
| CN | 102514471 A | 6/2012 | |
| CN | 103617692 A | 3/2014 | |
| CN | 204223172 U | 3/2015 | |
| CN | 205376593 U | 7/2016 | |
| CN | 206155799 U | 5/2017 | |
| CN | 206155799 U \* | 5/2017 | |
| CN | 206528646 U \* | 9/2017 | ............. H01M 2/10 |
| EP | 0445346 A1 | 9/1991 | |
| EP | 1806796 A1 | 7/2007 | |
| EP | 2649595 A1 | 10/2013 | |
| JP | H01227350 A | 9/1989 | |
| JP | H04324243 A | 11/1992 | |
| JP | H09022685 A | 1/1997 | |
| JP | 2006527467 A | 11/2006 | |
| JP | 2007157663 A | 6/2007 | |
| JP | 2007173179 A | 7/2007 | |
| JP | 2009205980 A | 9/2009 | |
| JP | 2011258444 A | 12/2011 | |
| JP | 2012119157 A | 6/2012 | |
| KR | 19980019512 U \* | 7/1998 | |
| WO | 2015081636 A1 | 6/2015 | |

\* cited by examiner

US 11,088,414 B2

BATTERY HOUSING APPARATUS AND UNMANNED AERIAL VEHICLE

CROSS-REFERENCES TO RELATED APPLICATIONS

This application is a continuation application of International Application No. PCT/CN2016/104368, filed on Nov. 2, 2016, the entire content of which is incorporated herein by reference.

TECHNICAL FIELD

The present disclosure relates to unmanned aerial vehicle technologies and, more particularly, to a battery housing apparatus and an unmanned aerial vehicle.

BACKGROUND

With the rapid development of the unmanned aerial vehicle technology, unmanned aerial vehicles are gradually adopted in various industries, such as civil, marine, and aviation industries.

Most small unmanned aerial vehicles use their own batteries to power the aerial vehicles. Thus, battery mounting is an important technology. If the batteries are not mounted in place, it is very dangerous. After an aerial vehicle takes off, batteries mounted on the aerial vehicle may get loosen or detached, thereby causing loss of power and crashing of the aerial vehicle. Moreover, it even poses a threat to human life and causes property damages. Thus, before the aerial vehicle takes off, it is extremely important to ensure that the batteries are one hundred percent securely mounted.

SUMMARY

One aspect of the present disclosure provides a battery housing apparatus, including: a housing body and a battery locking mechanism. The housing body is configured with at least one battery compartment for housing a battery. The battery locking mechanism is disposed on the housing body and configured to indicate whether the battery is mounted in place during a process of mounting the battery in the battery compartment and to lock the battery in the battery compartment after the battery is mounted in place.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Figure 1:
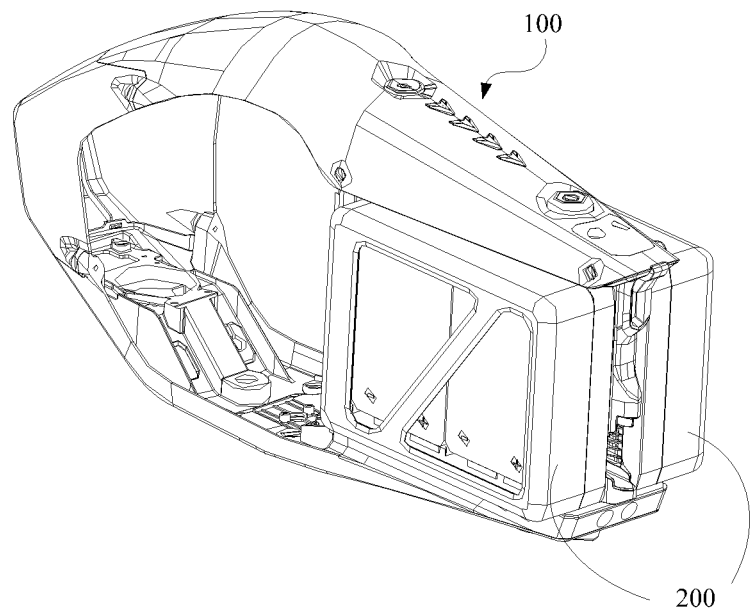
FIG. 1 is an overall view of batteries mounted in place according to an exemplary embodiment of the present disclosure.

Reference will now be made in detail to exemplary embodiments of the present disclosure, which are illustrated in the accompanying drawings. Wherever possible, the same reference numbers will be used throughout the drawings to refer to the same or like parts.

The present disclosure provides a battery housing apparatus that indicates whether batteries are mounted in place through a battery locking mechanism, facilitates service personnel to conveniently mount the batteries, and increases chances that the batteries are mounted in place. At the same time, batteries mounted in place are locked to prevent the batteries from loosening or falling off. The battery housing apparatus is suitable for unmanned aerial vehicles.

Referring to FIGS. 1-7, the present disclosure provides an exemplary battery housing apparatus 100. The battery housing apparatus 100 includes a housing body 1 and a battery locking mechanism 2. The battery locking mechanism 2 is disposed on the housing body 1. The housing body 1 includes at least one battery compartment 11, 12 for housing batteries 200. The battery locking mechanism 2 is used to indicate whether the batteries 200 are mounted in place during a process of mounting the batteries 200 in the compartments 11, 12 of the housing body 1. After the batteries 200 are mounted in place (shown in FIG. 1), the batteries 200 are locked in the battery compartments. An electricity capacity indicator 13 is disposed on top of the housing body 1. In some embodiments, the electricity capacity indicator 13 includes four LED indicators.

Figure 3:
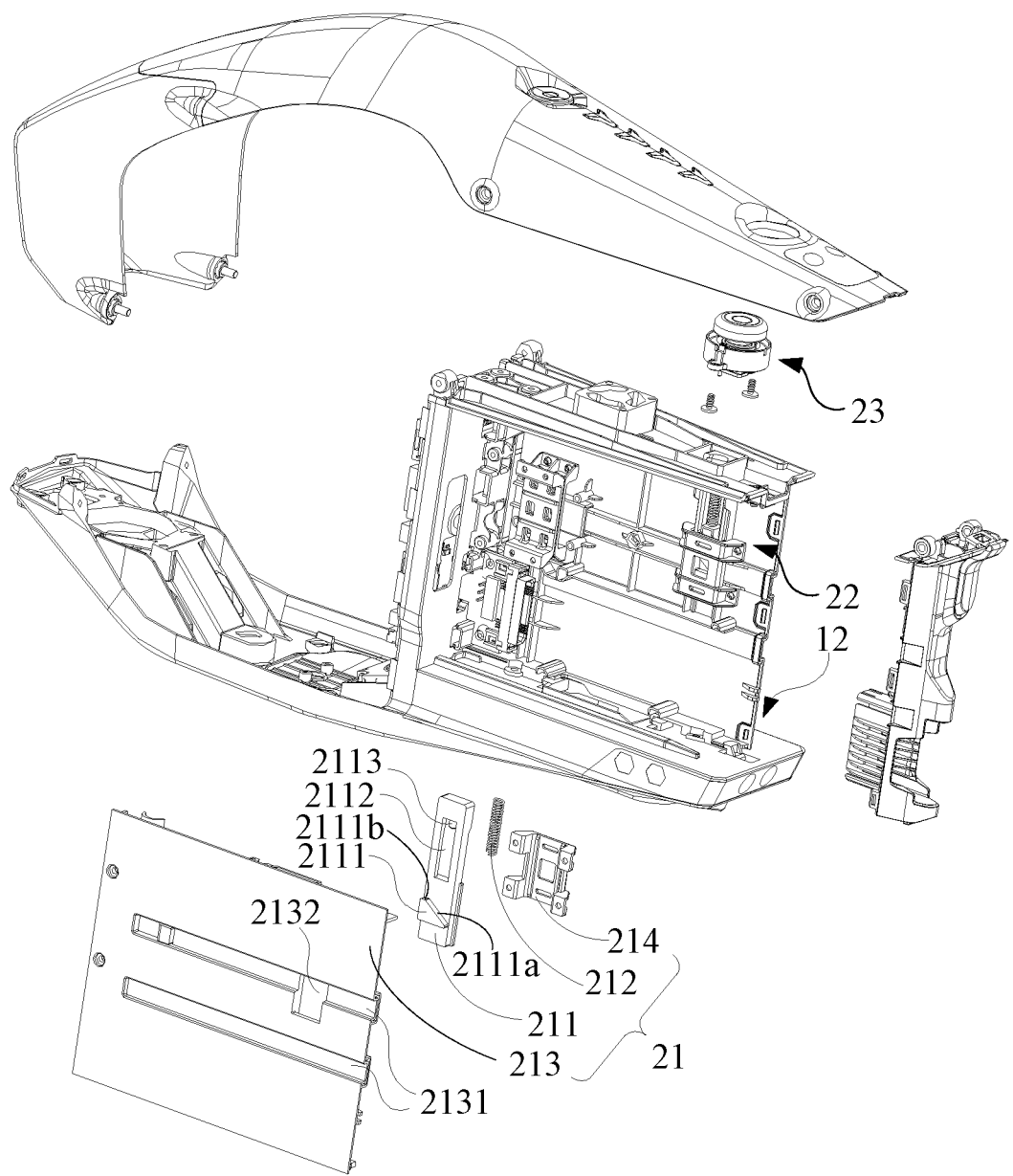
FIG. 3 is an exploded view of a battery housing apparatus according to an exemplary embodiment of the present disclosure.

For example, as shown in FIG. 3, the battery locking mechanism 2 includes locking assemblies 21, 22 and an indicator assembly 23. The indicator assembly 23 is disposed on the housing body 1, and cooperatively couples with the locking assemblies 21, 22. The locking assemblies 21, 22 are dislocated during a process of mounting the batteries in the battery compartments 11, 12, and are restored to lock the batteries in the battery compartments 11, 12 after the batteries are mounted in place. Because the indicator assembly 23 cooperatively couples with the locking assembly 21, the indicator assembly 23 is capable of indicating whether the batteries are mounted in place under a control of the locking assembly 21.

Figure 4:
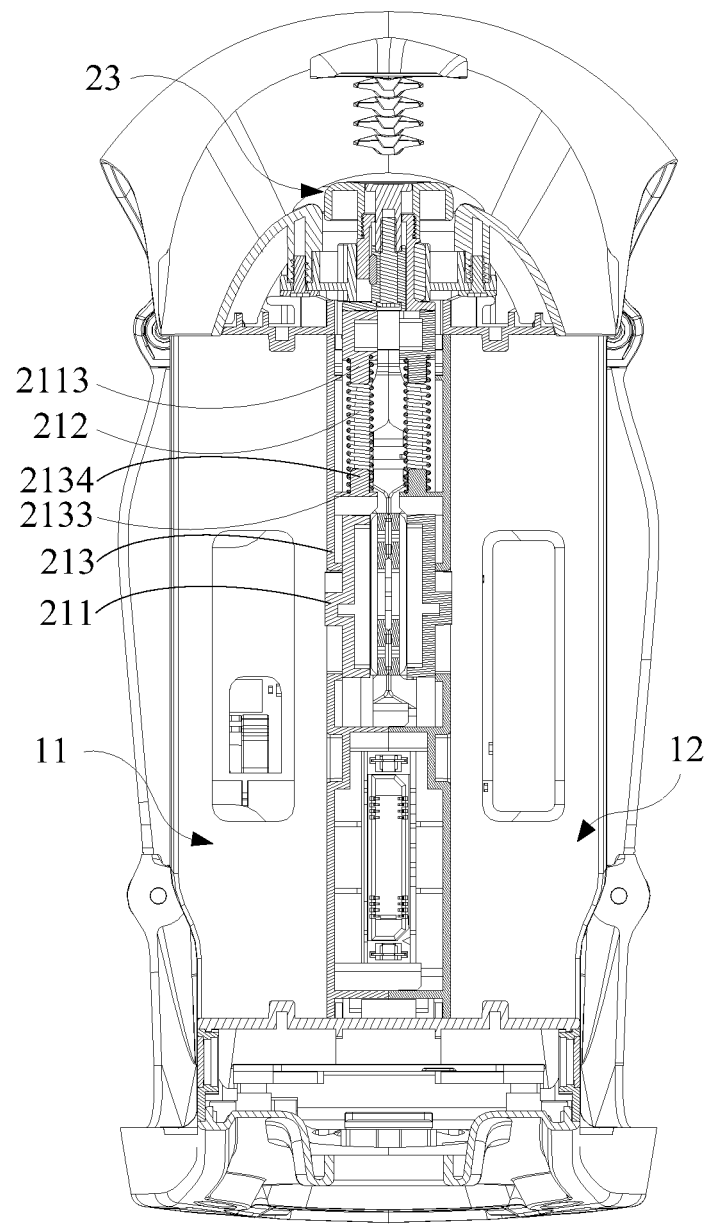
FIG. 4 is a cross-sectional view of a battery housing apparatus according to an exemplary embodiment of the present disclosure.

Referring further to FIG. 3 and FIG. 4, the locking assembly 21 includes a locking slider 211 and a slider spring 212. In the process of mounting the batteries in the battery compartments, the batteries overcome an elastic force of the slider spring 212 to dislocate the locking slider 211. After the batteries are mounted in place, the locking slider 211 is restored by the elastic force of the slider spring 212 to lock the batteries in the battery compartments 11, 12.

As shown in FIGS. 2-7, the indicator assembly 23 includes a key assembly, such as a first key assembly 231 and/or a second key assembly 232. The key assembly cooperatively couples with the locking assembly 21, and indicates whether the battery is mounted in place under the control of the locking assembly 21. Further, in the present disclosure, the indicator assembly 23 determines whether the battery is successfully mounted in place by checking a height of the battery relative to the housing body 1. It is intuitive and convenient for battery mounting and dismounting. For example, when the locking assembly 21 is dislocated and restored, the key assembly is placed at different heights relative to the housing body 1. In addition, the key assembly controls the locking assembly 21 to unlock the battery, such that the battery can be removed from the battery compartment. Further, in the present disclosure, the indicator assembly 23 includes an indicator bracket 234. The indicator bracket 234 is fixed to the housing body 1. The key assembly is disposed and enclosed in the indicator bracket 234. The indicator bracket 234 is fixedly connected to the housing body 1 by screws. Of course, the indicator bracket 234 may be connected to the housing body 1 in other manners, such as snapping, which is not limited herein.

Further, for the indicator assembly 23 to cooperatively couple with the locking assemblies 21, 22, in one embodiment, as shown in FIGS. 2-7, the indicator assembly 23 includes a key spring, such as a first key spring 235b and/or a second key spring 236b. When the locking assembly 21 is dislocated by the battery, the key assembly is restored by an elastic force of the key spring. When the locking assembly 21 is restored, the locking assembly 21 overcomes the elastic force of the key spring to dislocate the key assembly, such that the key assembly is placed at a different height relative to housing body 1.

In an exemplary embodiment, referring to FIGS. 2-7, a battery housing apparatus is provided. The battery housing apparatus 100 includes a housing body 1 and a battery locking mechanism 2. The housing body 1 includes a first battery compartment 11 and a second battery compartment 12 to house batteries 200. The battery locking mechanism 2 is disposed on the housing body 1. The battery locking mechanism 2 is used to indicate whether the battery 200 is mounted in place during a process of mounting the battery 200 in the first battery compartment 11 or the second battery compartment 12 of the housing body 1, and to lock the battery 200 in the first battery compartment 11 or the second battery compartment 12 after the battery 200 is mounted in place.

Figure 2:
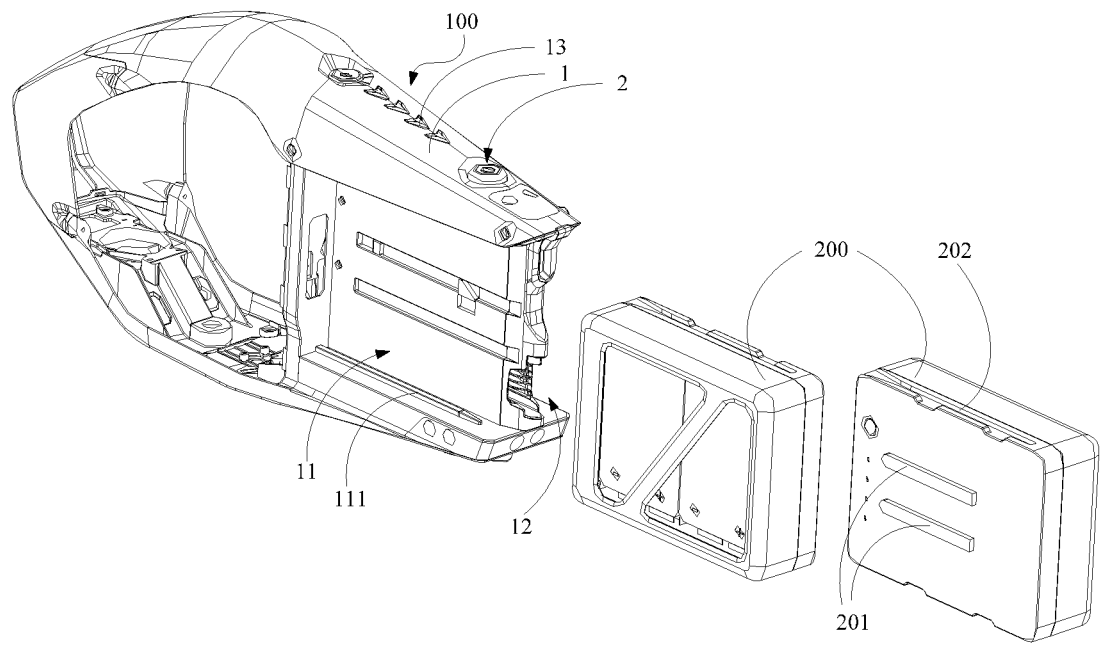
FIG. 2 is a three-dimensional view of a battery housing apparatus and batteries according to an exemplary embodiment of the present disclosure.

For example, as shown in FIG. 2, FIG. 3, and FIG. 4, the battery locking mechanism 2 includes a first locking assembly 21, a second locking assembly 22, and an indicator assembly 23. The indicator assembly 23 is disposed on the housing body 1, and cooperatively couples with the first locking assembly 21 and the second locking assembly 22, respectively. The first locking assembly 21 is dislocated by the battery 200 in the process of mounting the battery 200 in the first battery compartment 11, and is restored to lock the battery 200 in the first battery compartment 11 after the battery 200 is mounted in place. Because the indicator assembly 23 cooperatively couples with the first locking assembly 21, the indicator assembly 23 is capable of indicating whether the battery 200 is mounted in place under a control of the first locking assembly 21. Similarly, the second locking assembly 22 is dislocated by the battery 200 in the process of mounting the battery 200 in the second battery compartment 12 and is restored to lock the battery 200 in the second battery compartment 12 after the battery 200 is mounted in place. Because the indicator assembly 23 cooperatively couples with the second locking assembly 22, the indicator assembly 23 is capable of indicating whether the battery 200 is mounted in place under a control of the second locking assembly 22. It should be noted that, in other embodiments, the battery housing apparatus 100 only houses one battery 200. At this time, the battery locking mechanism 2 includes only the first locking assembly 21 or the second locking assembly 22, which is dislocated by the battery 200 in the process of mounting the battery 200 in the first battery compartment 11 or the second battery compartment 12, and is restored to lock the battery 200 in the first battery compartment 11 or the second battery compartment 12 after the battery 200 is mounted in place.

As shown in FIG. 3 and FIG. 4, the first locking assembly 21 includes a locking slider 211, a slider spring 212, and a slider bracket 213. The slider bracket 213 is fixed in the first battery compartment 11. The locking slider 211 is supported on the slider bracket 213 by an elastic force of the slider spring 212. In the process of mounting the battery 200 in the first battery compartment 11, the battery 200 overcomes the elastic force of the slider spring 212 to dislocate the locking slider 211. After the battery 200 is mounted in place, the locking slider 211 is restored by the elastic force of the slider spring 212 to lock the battery 200 in the first battery compartment 11.

Further, the first locking assembly 21 includes a slider blocker 214. The slider blocker 214 is fixedly connected to the slider bracket 213. The locking slider 211 is disposed between the slider blocker 214 and the slider bracket 213, such that the locking slider 211 is confined to move in a dislocation direction.

The slider bracket 213 is fixed in the first battery compartment 11. For example, in some embodiments as illustrated in the drawings, the slider bracket 213 is fixed to the bottom of the battery compartment 11. The slider bracket 213 includes a first guide slot 2131 coupled to a first guide rail 201 on the battery 200 extending in a direction of inserting the battery 200 and a first open slot 2132 connecting to the first guide slot 2131. In some embodiments as illustrated in the drawings, to mount the battery 200 more securely in the battery housing apparatus 100, the slider bracket 213 is configured with two first guide slots 2131 in parallel with each other. One of the two first guide slots 2131 is connected to the first open slot 2132. Correspondingly, the battery 200 is configured with two first guide rails 201 in parallel with each other. Of course, in other embodiments, the slider bracket 213 may be configured with three or more first guide slots 2131 in parallel with each other.

As shown in FIG. 2 and FIG. 3, the locking slider 211 is disposed on a side of the slider bracket 213 facing away from the battery 200, and is partially exposed in the first guide slot 2131 through the first open slot 2132. When the battery 200 is being mounted in the first battery compartment 11, the first guide rails 201 insert into the first guide slots 2131 and dislocate the locking slider 211. For example, a locking portion 2111 is disposed on a side of the locking slider 211 adjacent to the slider bracket 213. The locking portion 2111 is exposed in the first guide slot 2131 through the first open slot 2132. Further, a second open slot 2112 and a first fixing post 2113 adjacent to the second open slot 2112 are disposed on the locking slider 211. As shown in FIG. 4, an extension portion 2133 is disposed on a side of the slider bracket 213 adjacent to the locking slider 211. The extension portion 2133 inserts into the second open slot 2112. A second fixing post 2134 is disposed on the extension portion 2133 and extends toward the first fixing post 2113. Two ends of the slider spring 212 are configured to sleeve on the first fixing post 2113 and the second fixing post 2132, respectively, such that the locking slider 211 is elastically supported on the slider bracket 213.

The dislocation direction of the locking slider 211 is perpendicular to the direction of the battery insertion. As shown in FIG. 3, the locking portion 2111 includes a guide surface 2111*a* disposed on a side of the locking portion 2111 facing toward the direction of the battery insertion to guide the first guide rail 201, and a locking surface 2111*b* disposed on a side of the locking portion 2111 facing away from the direction of the battery insertion to lock the first guide rail 201. After the battery 200 is mounted in place, the locking portion 2111 locks the battery 200 in the direction of the battery insertion.

As shown in FIG. 2 and FIG. 3, the first battery compartment 11 includes a second guide rail 111 disposed on a side wall and extending in the direction of the battery insertion. That is, the second guide rail 111 is disposed on the housing body 1. Correspondingly, the battery 200 includes a second guide slot 202. The second guide rail 111 couples with the second guide slot 202 on the battery 200 to lock the battery 200 in a direction vertical to the bottom of the first battery compartment 11. Of course, in other embodiments, the first battery compartment 11 includes a second guide slot disposed on the side wall and extending in the direction of the battery insertion. Correspondingly, the battery 200 includes a second guide rail. The second guide slot disposed on the housing body 1 couples with the second guide rail disposed on the battery 200 to lock the battery 200 in the vertical direction.

In some embodiments as illustrated in the drawings, the first battery compartment 11 and the second battery compartment 12 are disposed on two opposite sides of the housing body 1, respectively. The first locking assembly 21 corresponds to the first battery compartment 11 and the second locking assembly 22 corresponds to the second battery compartment 12. The second locking assembly 22 is the same as the first locking assembly 21 and the second battery compartment 12 is the same as the first battery compartment 11. Thus, the detailed technical characteristics of the second locking assembly 22 and the second battery compartment 12 can be referred to the description of the first locking assembly 21 and the first battery compartment 11, respectively, and will not be repeated herein.

As shown in FIG. 2, FIG. 4, FIG. 5, and FIG. 7, the indicator assembly 23 includes a first key assembly 231 and a second key assembly 232 mutually enclosed with each other. The first key assembly 231 cooperatively couples with the first locking assembly 21 and the second key assembly 232 cooperatively couples with the second locking assembly 22, such that the first key assembly 231 indicates whether the battery 200 is mounted in place in the first battery compartment 11 under a control of the first locking assembly 21 and the second key assembly 232 indicates whether the battery 200 is mounted in place in the second battery compartment 12 under a control of the second locking assembly 22. Further, in some embodiments, when the first locking assembly 21 is dislocated and restored, the first key assembly 231 is placed at different heights relative to the housing body 1. Similarly, when the second locking assembly 22 is dislocated and restored, the second key assembly 232 is placed at different heights relative to the housing body 1. In addition, when the battery 200 is taken out from the battery housing apparatus 100, the first key assembly 231 controls the first locking assembly 21 to unlock the battery 200 to allow the battery 200 to be taken out from the first battery compartment 11. Similarly, the second key assembly 232 controls the second locking assembly 22 to unlock the battery 200 to allow the battery 200 to be taken out from the second battery compartment 12. It should be noted that, in other embodiments, the battery housing apparatus 100 only houses one battery 200. At this time, the indicator assembly 23 includes either the first key assembly 231 or the second key assembly 232, and indicates whether the battery 200 is mounted in place in the first battery compartment 11 under the control of the first locking assembly 21 or in the second battery compartment 12 under the control of the second locking assembly 22.

Further, the indicator assembly 23 includes an indicator bracket 234. The indicator bracket 234 is fixed to the housing body 1. The indicator bracket 234, the second key assembly 232, and the first key assembly 231 are sequentially nested. In some embodiments as illustrated in the drawings, the indicator bracket 234 is fixedly connected to the housing body 1 by screws.

Figure 5:
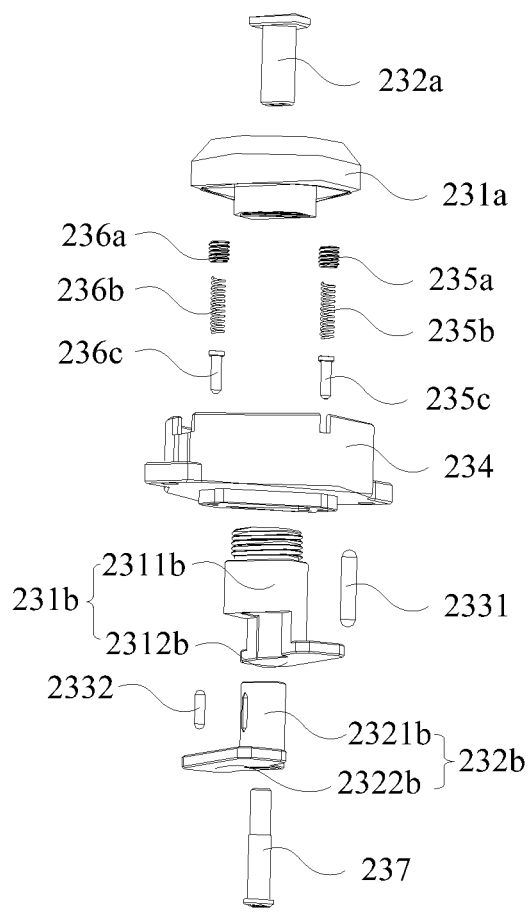
FIG. 5 is an exploded view of an indication assembly according to an exemplary embodiment of the present disclosure.
Figure 6:
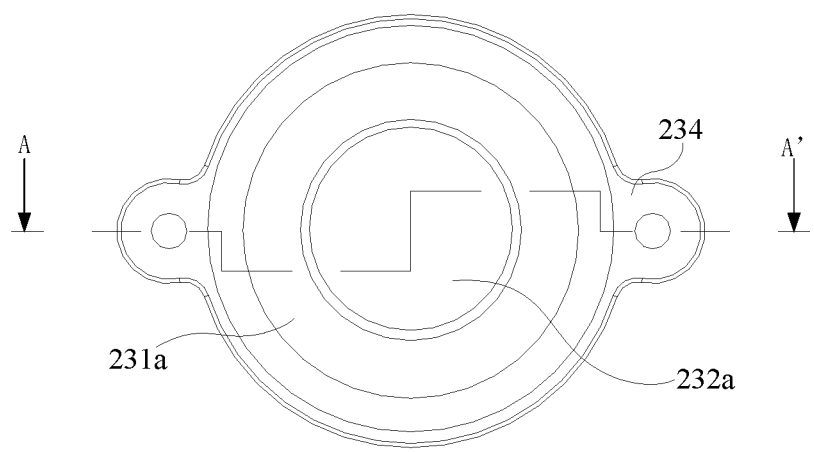
FIG. 6 is a top view of an indication assembly according to an exemplary embodiment of the present disclosure.
Figure 7A:
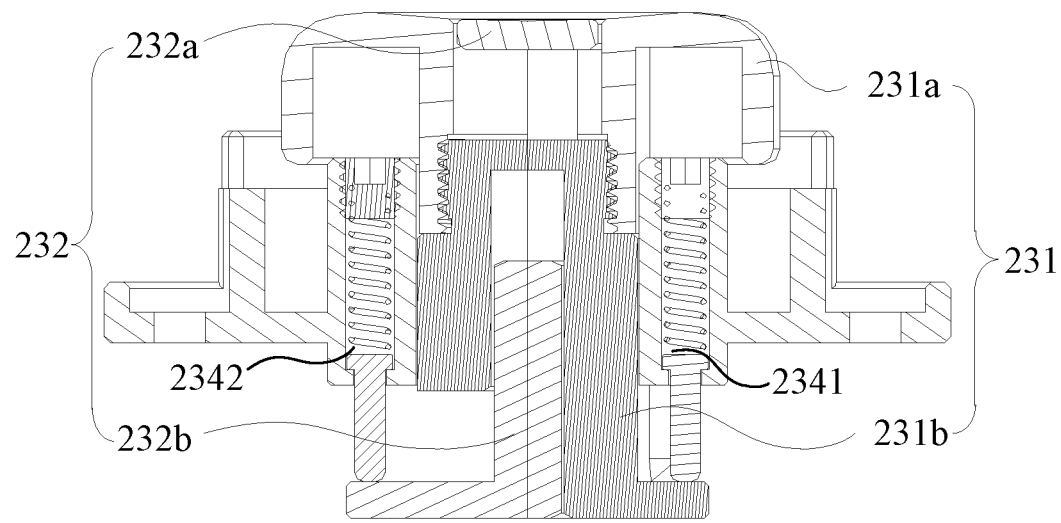
FIG. 7A is a cross-sectional view of an indication assembly in a first operation state along AA' line in FIG. 6.

As shown in FIG. 5 and FIG. 7, the first key assembly 231 includes a first key 231*a* and a first key lock 231*b*. The second key assembly 232 includes a second key 232*a* and a second key lock 232*b*. The first key lock 231*b* includes a first cylinder 2311*b* and a first extension 2312*b* disposed on an end of the first cylinder 2311*b*. The second key lock 232*b* includes a second cylinder 2321*b* and a second extension 2322*b* disposed on an end of the second cylinder 2321*b*. The indicator bracket 234, the second cylinder 2321*b*, and first cylinder 2311*b* are mutually enclosed. The first key 231*a* is fixed to the other end of the first cylinder 2311*a*. The second key 232*a* is fixed to the other end of the second cylinder 2321*b*. The second key 232*a* is enclosed in the first key 231*a*. The first extension 2312*b* and the second extension 2322*b* extend toward both sides of the indicator bracket 234, respectively. When the first locking assembly 21 and the second locking assembly 22 are restored, the first extension 2312*b* and the second extension 2322*b* contact with the first locking assembly 21 and the second locking assembly 22, respectively, as shown in FIG. 7A. Then, the indicator assembly 23 is in a first operation state.

In some embodiments as illustrated in the drawings, the first cylinder 2311*b* connects to the first key 231*a* by screw threads. The second cylinder 2321*b* is fixedly connected to the second key 232*a* by screwing a screw 237 into one end of the second cylinder 2321*b*. Of course, in other embodiments, the coupling between the first cylinder 2311*b* and the first key 231*a* and the coupling between the second cylinder 2321*b* and the second key 232*a* may be implemented in other manners, such as being bonded by an adhesive substance.

To prevent the first cylinder 2311*b* from rotating relative to the indicator bracket 234 or the second cylinder 2321*b* from rotating relative to the first cylinder 2311*b*, a rotation-limiting mechanism is configured between the indicator bracket 234 and the first key assembly 231 or between the first key assembly 231 and the second key assembly 232. Further, the indicator assembly 23 includes at least one limiting key (2331 or 2332 as shown in FIG. 5). The at least one limiting key (2331 or 2332 as shown in FIG. 5) is configured between the indicator bracket 234 and the first cylinder 2311*b* or between the first cylinder 2311*b* and the second cylinder 2321*b* to prevent the first cylinder 2311*b* from rotating relative to the indicator bracket 234 or the second cylinder 2321*b* from rotating relative to the first cylinder 2311*b*. For example, as shown in FIG. 4 and FIG. 5, the at least one limiting key includes a first limiting key 2331 and a second limiting key 2332. The first limiting key 2331 is disposed between the indicator bracket 234 and the first cylinder 2311*b* to prevent the first cylinder 2311*b* from rotating relative to the indicator bracket 234. The second limiting key 2332 is disposed between the first cylinder 2311*b* and the second cylinder 2321*b* to prevent the second cylinder 2321 from rotating relative to the first cylinder 2311*b*.

As shown in FIG. 7, a first receiving hole 2341 and a second receiving hole 2342 are disposed on the indicator bracket 234. In some embodiments, the first receiving hole 2341 and the second receiving hole 2342 are disposed on opposite sides.

Figure 7B:
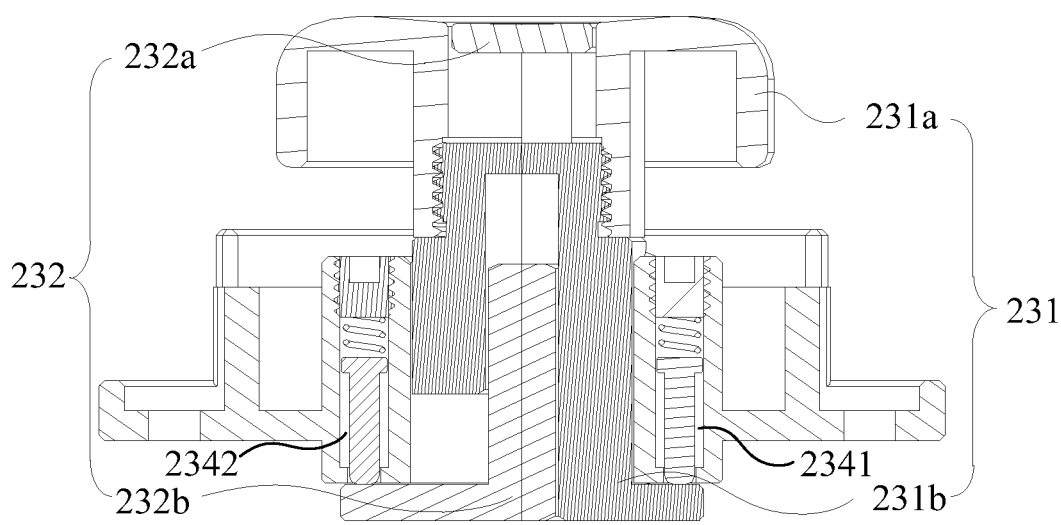
FIG. 7B is a cross-sectional view of an indication assembly in a second operation state along AA' line in FIG. 6.

Further, as shown in FIG. 5 and FIG. 7, the indicator assembly 23 includes a first threaded stud 235*a*, a first key spring 235*b*, a first lock pin 235*c*, a second threaded stud 236*a*, a second key spring 236*b*, and a second lock pin 236*c*. The first lock pin 235*c* and the first key spring 235*b* are locked in the first receiving hole 2341 by the first threaded stud 235*a*, such that the first lock pin 235*c* elastically acts on the first extension 2312*b*. After the first locking assembly 21 is dislocated, the first lock pin 235*c* drives the first key assembly 231 to restore (the first operating state as shown in FIG. 7A). After the first locking assembly 21 is restored, the first locking assembly 21 overcomes an elastic force of the first key spring 235*b* to dislocate the first key assembly 231 (a second operating state as shown in FIG. 7B). It should be noted that, in some embodiments, to overcome the elastic force of the first key spring 235*b* by the first locking assembly 21 to dislocate the first key assembly 231 more effectively, the locking slider 211 of the first locking assembly 21 has a flat surface on a side adjacent to the first key assembly 231. Similarly, the locking slider 221 of the second locking assembly 22 has a flat surface on a side adjacent to the second key assembly 232.

Similarly, the second lock pin 236*c* and the second key spring 236*b* are locked in the second receiving hole 2342 by the second threaded stud 236*a*, such that second lock pin 236*c* elastically acts on the second extension 2322*b*. After the second locking assembly 22 is dislocated, the second lock pin 236*c* drives the second key assembly 232 to restore (the first operating state as shown in FIG. 7A). After the second locking assembly 22 is restored, the second locking assembly 22 overcomes an elastic force of the second key spring 236*b* to dislocate the second key assembly 232 (the second operating state as shown in FIG. 7B).

The operation principle of the battery housing apparatus in some embodiments will be described below.

During the process of mounting the battery 200 in the first battery compartment 11 of the battery housing apparatus 100, the battery 200 overcomes the elastic force of the slider spring 212 in the first locking assembly 21 to dislocate the locking portion 2111 of the locking slider 211. In the process, the indicator assembly 23 is in the first operating state. The first lock pin 235*c* in the indicator assembly 23 drives the first key assembly 231 to restore, such that the first key assembly 231 is placed at a different height relative to the housing body 1. That is, the first key 231*a* is placed at a different height relative to the housing body 1. After the battery 200 is mounted in place (as show in FIG. 1), the locking portion 2111 of the locking slider 211 is restored by the elastic force of the slider spring 212. Then, a locking surface 2111*b* of the locking portion 2111 of the locking slider 211 tightly contacts with the battery 200 to lock the battery 200 in the direction of the battery insertion. The indicator assembly 23 is in the second operating state. The locking slider 211 of the first locking assembly 21 overcomes the elastic force of the first key spring 235*b* of the indicator assembly 23 to dislocate the first key assembly 231. That is, the first key 231*a* is dislocated. Then, the first key 231*a* is dislocated to reach a same height as an external surface of the housing body 1, thereby indicating that the battery is mounted in place (as shown in FIG. 1).

When the battery 200 is taken out of the first battery compartment 11, the first key 231*a* of the first key assembly 231 is pressed. Then, the first key assembly 231 controls the locking slider 211 of the first locking assembly 21 to dislocate to unlock the battery 200, such that the battery 200 can be taken out of the first battery compartment 11.

Similarly, the battery is mounted in place in the second battery compartment 12 and the battery is taken out of the second battery compartment 12. The specific process is not described in detail.

Figure 8:
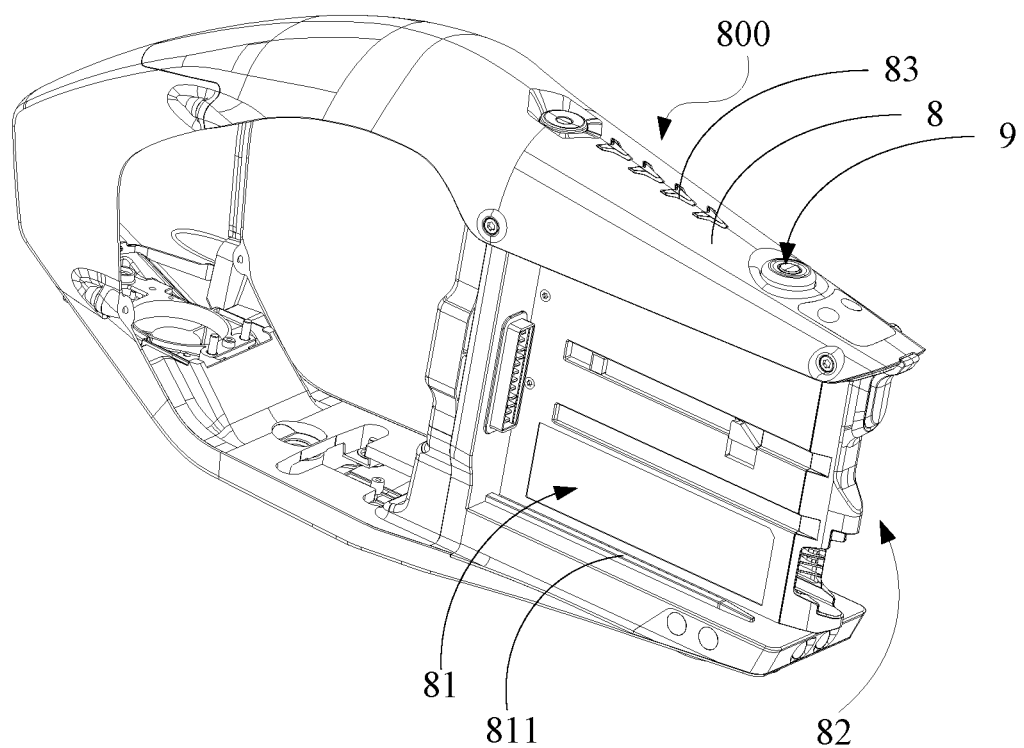
FIG. 8 is an overall view of a battery housing apparatus according to another exemplary embodiment of the present disclosure.

Referring to FIG. 8, the present disclosure provides another battery housing apparatus 800. The battery housing apparatus 800 includes a housing body 8 and a battery locking mechanism 9. The battery locking mechanism 9 is disposed on the housing body 8. The housing body 8 includes at least one battery compartment 81, 82 to house the battery 200. The first battery compartment 81 includes a guide rail 811 disposed on a side wall and extending in the direction of the battery insertion. That is, the guide rail 811 is disposed on the housing body 8. Further details of the guide rail 811 can be referred to the foregoing description of the second guide rail 111 as shown in FIG. 2, and will not be repeated here. The battery locking mechanism 9 is used to indicate whether the battery 200 is mounted in place during a process of mounting the battery 200 in the battery compartment of the housing body 8, and locks the battery 200 in the battery compartment after the battery 200 is mounted in place. An electricity capacity indicator 83 is disposed on top of the housing body 8. In some embodiments, the electricity capacity indicator 83 includes four LED indicators.

Figure 9:
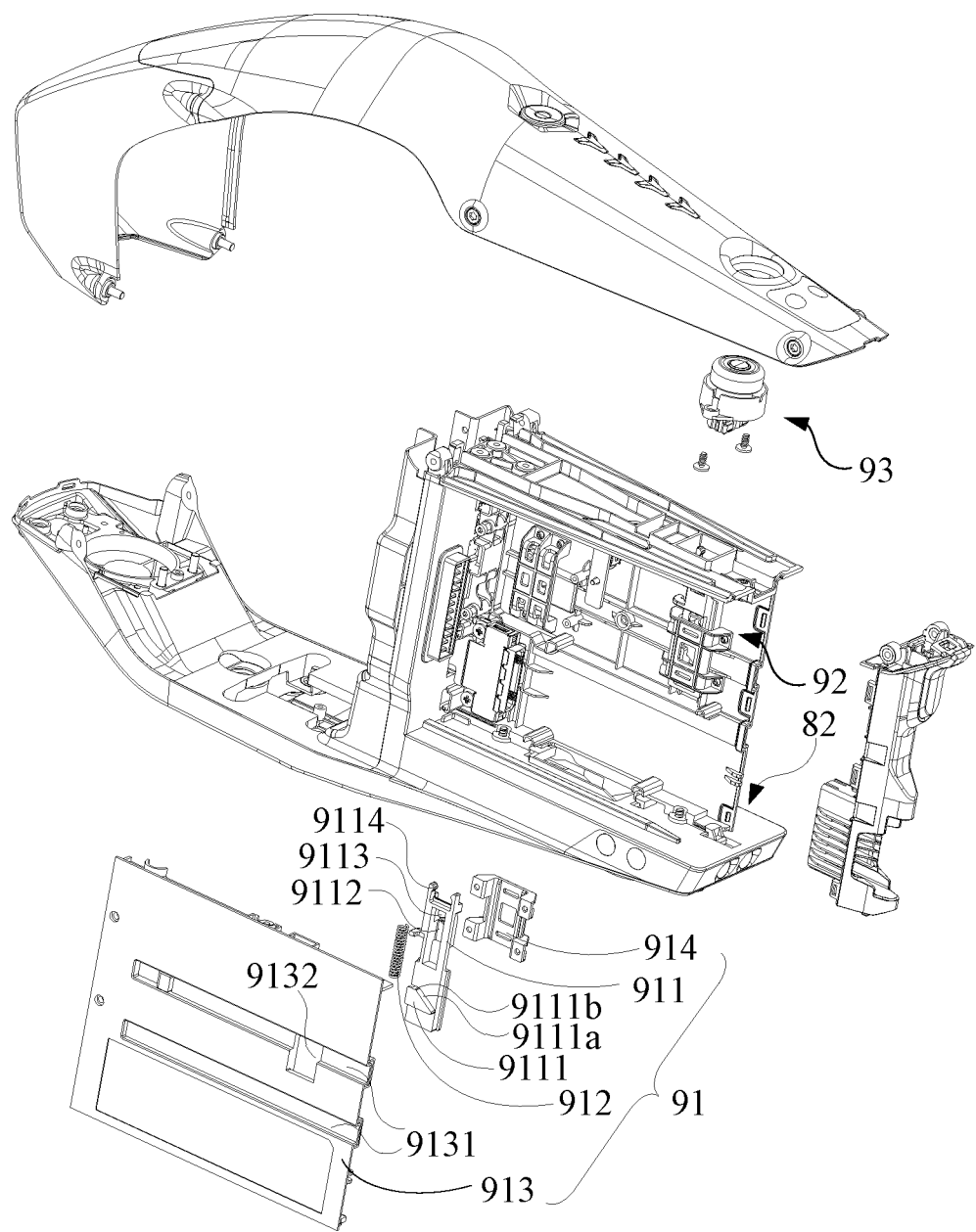
FIG. 9 is an exploded view of a battery housing apparatus according to another exemplary embodiment of the present disclosure.

For example, as shown in FIG. 9, the battery locking mechanism 9 includes locking assemblies 91, 92, and an indicator assembly 93. The indicator assembly 93 is disposed on the housing body 8. The indicator assembly 93 cooperatively couples with the locking assemblies 91, 92. The locking assemblies 91, 92 are dislocated by the batteries in the process of mounting the batteries in the battery compartment. After the batteries are mounted in place, the locking assemblies 91, 92 lock the batteries in the battery compartments. Because the indicator assembly 93 cooperatively couples with the locking assemblies 91, 92, the indicator assembly 93 indicates whether the batteries are mounted in place under controls of the locking assemblies 91, 92.

Figure 10:
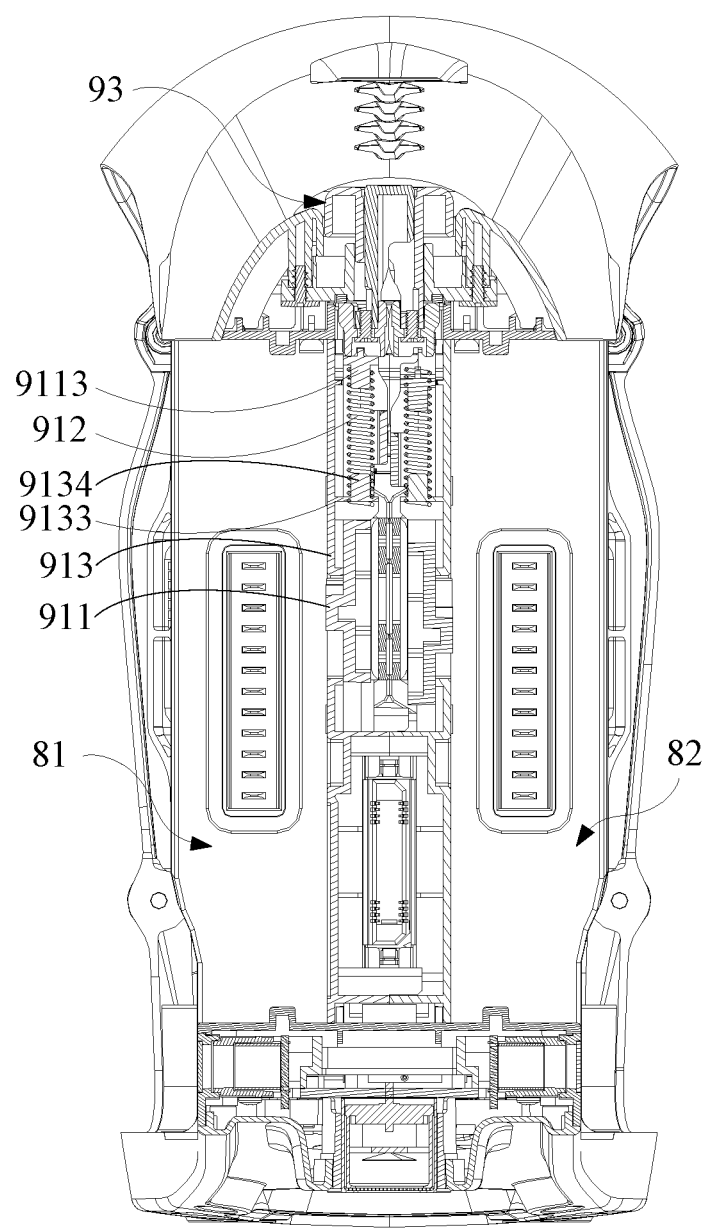
FIG. 10 is a cross-sectional view of a battery housing apparatus according to another exemplary embodiment of the present disclosure.

As shown in FIG. 9 and FIG. 10, the locking assembly includes a locking slider 911, a slider spring 912, a slider bracket 913, and a slider blocker 914. In the process of mounting the battery in the battery compartment, the battery overcomes an elastic force of the slider spring 912 to dislocate the locking slider 911. After the battery is mounted in place, the locking slider 911 is restored by the elastic force of the slider spring 912 to lock the battery in the battery compartment 81, 82. As shown in FIG. 9, the slider bracket 913 includes a first guide slot 9131 and a first open slot 9132 connecting to the first guide slot 9131. Further, a locking portion 9111 is disposed on a side of the locking slider 911 adjacent to the slider bracket 913. The locking portion 9111 includes a guide surface 9111a disposed on a side of the locking portion 9111 facing toward the direction of the battery insertion and a locking surface 9111b disposed on a side of the locking portion 9111 facing away from the direction of the battery insertion. As shown in FIG. 9 and FIG. 10, a second open slot 9112 and a first fixing post 9113 adjacent to the second open slot 9112 are disposed on the locking slider 911. As shown in FIG. 10, an extension portion 9133 is disposed on a side of the slider bracket 913 adjacent to the locking slider 911. A second fixing post 9134 is disposed on the extension portion 9133 and extends toward the first fixing post 9113. Further details about the slider bracket 913, the slider blocker 914, the guide surface 9111a, the second open slot 9112, the first fixing post 9113, the first guide slot 9131, the first open slot 9132, the extension portion 9133, and the second fixing post 9134 can be referred to the foregoing descriptions of the slider bracket 213, the slider blocker 214 and the guide surface 2111a, the second open slot 2112, the first fixing post 2113, the first guide slot 2131, the first open slot 2132, the extension portion 2133, and the second fixing post 2134, respectively, and will not be repeated here.

As shown in FIGS. 8-12, the indicator assembly 93 includes a key assembly, such as a first key assembly 931 and/or a second key assembly 932. The key assembly cooperatively couples with the locking assembly 91, 92, and indicates whether the battery is mounted in place under a control of the locking assembly 91, 92. Further, in the present disclosure, the indicator assembly 93 determines whether the battery is mounted in place by checking a height of the battery relative to the housing body 8. It is intuitive and convenient for battery mounting and dismounting. For example, after the locking assembly 91, 92 is dislocated and restored, the key assembly is placed at different heights relative to the housing body 8. In addition, the key assembly controls the locking assembly 91, 92 to unlock the batteries, such that the batteries can be removed from the battery compartments. Further, in the present disclosure, the indicator assembly 93 includes an indicator bracket 934. The indicator bracket 934 is fixedly connected to the housing body 8. The key assembly is disposed and enclosed in the indicator bracket 934. The indicator bracket 934 is fixed to the housing body 8 by screws. Of course, the indicator bracket 934 may be fixed to the housing body 8 in other manners, such as snapping, which will not be limited herein.

Further, for the indicator assembly to cooperatively couples with the locking assembly, as shown in FIGS. 8-12, the key assembly is connected to the locking assembly 91, 92. Thus, after the locking assembly 91, 92 is dislocated and restored, the locking assembly 91, 92 drives the key assembly to different heights relative to the housing body. The key assembly may be connected to the locking assembly through snapping or bonding by an adhesive substance, which will not be limited herein.

Referring to FIGS. 8-12, the present disclosure provides another exemplary battery housing apparatus. Compared to the embodiments illustrated in FIGS. 1-7, the differences include the cooperatively coupling methods between the first key assembly 931 and the first locking assembly 91, between the second key assembly 932 and the second locking assembly 92, and between the first key assembly 931 and the second key assembly 932. The specifics are described below.

The first key assembly 931 is connected to the first locking assembly 91. After the first locking assembly 931 is dislocated and restored, the first locking assembly 91 drives the first key assembly 931 to different heights relative to the housing body 8. The second key assembly 932 is connected to the second locking assembly 92. After the second locking assembly 932 is dislocated and restored, the second locking assembly 92 drives the second key assembly 932 to different heights relative to the housing body 8.

Figure 11:
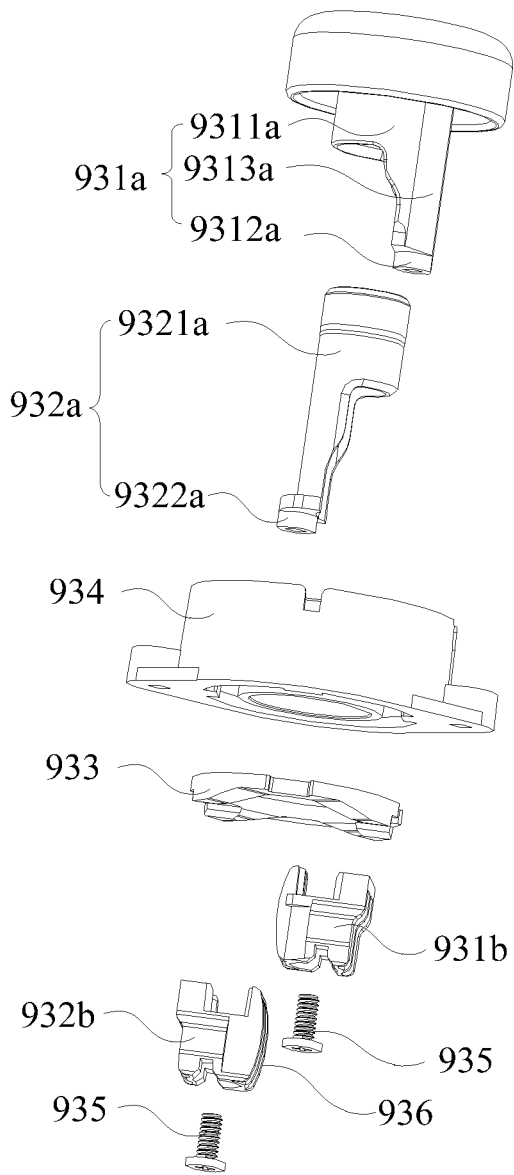
FIG. 11 is an exploded view of an indication assembly according to another exemplary embodiment of the present disclosure.
Figure 12A:
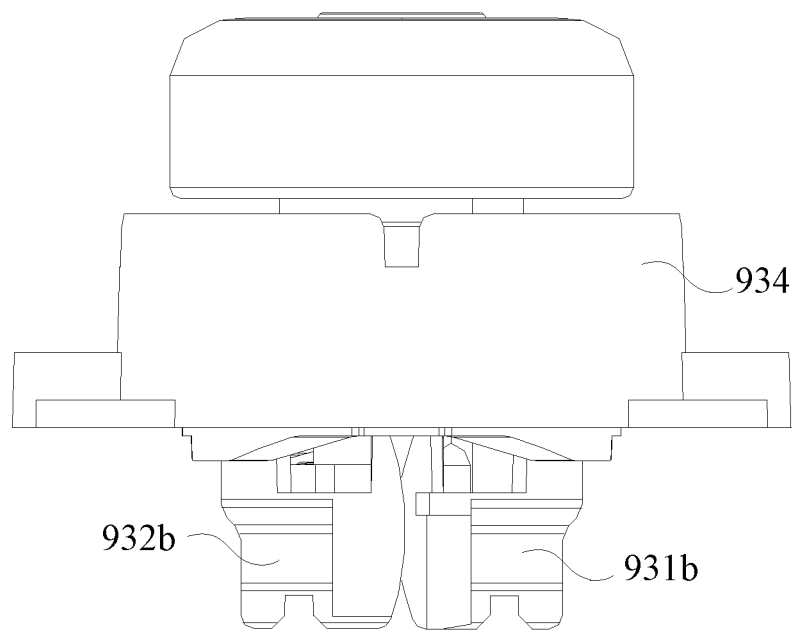
FIG. 12A is a side view of an indication assembly according to another exemplary embodiment of the present disclosure.
Figure 12B:
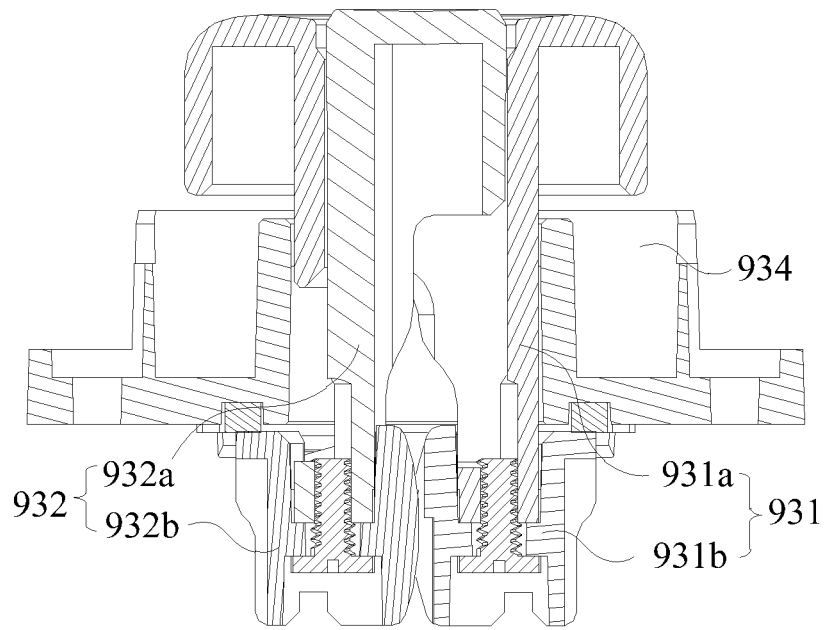
FIG. 12B is a cross-sectional view of an indication assembly according to another exemplary embodiment of the present disclosure.

In addition, as shown in FIG. 11, the first key assembly 931 includes a first key 931a and a first key lock 931b. The second key assembly 932 includes a second key 932a and a second key lock 932b. In some embodiments, the first key 931a includes a first cylinder 9311a and a first fixing portion 9312a disposed on one end of the first cylinder 9311a. The second key 932a includes a second cylinder 9321a and a second fixing portion 9322a disposed on one end of the second cylinder 9321a. The indicator bracket 934, the first cylinder 9311a, and the second cylinder 9321a are enclosed with each other. The first key lock 931b is connected between the first fixing portion 9312a and the first locking assembly 91. After the first locking assembly 91 is dislocated and restored, the first locking assembly 91 drives the first key assembly 931 to different heights relative to the housing body 8. The second key lock 932b is connected between the second fixing portion 9322a and the second locking assembly 92. After the second locking assembly 92 is dislocated and restored, the second locking assembly 92 drives the second key assembly 932 to different heights relative to the housing body 8.

As shown in FIG. 10 and FIG. 11, the first key lock 931b and the second key lock 932b are fixedly connected to the first fixing portion 9312a and the second fixing portion 9322a by screws 935, respectively. In other embodiments, the first key lock 931b and the first fixing portion 9312a may be fixedly connected in other manners, for example, being bonded by an adhesive substance, which will not be limited herein.

As shown in FIG. 9 and FIG. 10, the first key lock 931b and the second key lock 932b are snapped to the first locking assembly 91 and the second locking assembly 92, respectively. In some embodiments, a snapping portion 9114 is disposed on a side of the locking slider 911 of the first locking assembly 91 adjacent to the first key lock 931b. The snapping portion 9114 is connected to the first key lock 931b and the second key lock 932b, respectively. Similarly, a snapping portion is disposed on a side of the locking slider 921 of the second locking assembly 92 adjacent to the second key lock 932b. Of course, in other embodiments, the first key lock 931b and the second key lock 932b may be connected to the first locking assembly 91 and the second locking assembly 92 in other manners, respectively, for example, being bonded by an adhesive substance, which will not be limited herein.

As shown in FIG. 11, gaskets 933 are disposed between both the first key lock 931b and the second key lock 932b and the indicator bracket 934. When the first key 931a or the second key 932a pops up, the gasket 933 reduces an impact by the first key 931a or the second key 932a to protect the first key 931a or the second key 932a and reduces noise at the same time. In some embodiments, the gaskets 933 can be made of rubber, or other elastic material, such as a thermoplastic elastomer.

The indicator bracket 934 couples with the first cylinder 9311a by a D-shaped cross-section in a direction vertical to an axis direction to prevent the first cylinder 9311a from rotating relative to the indicator bracket 934. As shown in FIG. 11, a D-shaped portion 9313a is disposed on a side of the first cylinder 9311a. Because the first cylinder 9311a is enclosed in the indicator bracket 934, correspondingly, another D-shaped portion (not shown) is disposed in the indicator bracket 934 matching the D-shaped portion 9313a, such that the indicator bracket 934 couples with the first cylinder 9311a by a D-shaped cross-section in a direction vertical to the axis direction.

As shown in FIG. 11, at least one rotation-limiting rib 936 is configured on the first key lock 931b and the second key lock 932b. In some embodiments, three rotation-limiting ribs 936 are configured on both the first key lock 931b and the second key lock 931b. At least one rotation-limiting rib 936 on the first key lock 931b misaligns with at least one rotation-limiting rib 936 on the second key lock 932b to prevent the second cylinder 9321a from rotating relative to the first cylinder 9311a.

The operation principle of the battery housing apparatus of some embodiments will be described below.

In the process of mounting the battery 200 in the first battery compartment 81 of the battery housing apparatus 800, the battery 200 overcomes the elastic force of the slider spring 912 in the first locking assembly 91 to dislocate the locking portion 9111 of the locking slider 911. In the process, because the first locking assembly 91 is connected to first key assembly 931 of the indicator assembly 93, the first locking assembly 91 drives the first key assembly 931 to different heights relative to the housing body 8. That is, the first key 931a is placed at different heights relative to the housing body 8. After the battery 200 is mounted in place (as shown in FIG. 1), the locking portion 9111 of the locking slider 911 is restored by the elastic force of the slider spring 912. Then, a locking surface 9111b of the locking portion 9111 of the locking slider 911 tightly contacts with the battery 200 to lock the battery 200 in the direction of the battery insertion. Because the first locking assembly 91 is connected to the first key assembly 931 of the indicator assembly 93, the first locking assembly 91 drives the first key assembly 931 to different heights relative to the housing body 8. The first key 931a is dislocated to reach a same height as an external surface of the housing body 8, thereby indicating that the battery 200 is mounted in place.

When the battery 200 is taken out of the first battery compartment 81, the first key 931a of the first key assembly 931 is pressed. Then, the first key assembly 931 controls the locking slider 911 of the first locking assembly 91 to dislocate to unlock the battery 200, such that the battery 200 can be taken out of the first battery compartment 81.

Similarly, the battery is mounted in place in the second battery compartment and the battery is taken out of the second battery compartment. The specific process is not described in detail.

It should be noted that the shapes of the housing bodies illustrated in FIGS. 1-7 and in FIGS. 8-12 may be the same or different, which will not be limited herein.

As disclosed herein, the indication of mounting the battery in place facilitates service personnel to conveniently mount the batteries and increases chances that the batteries are mounted in place. At the same time, batteries mounted in place are locked to prevent the batteries from loosening or falling off, particularly suitable for unmanned aerial vehicles.

The present disclosure also provides an unmanned aerial vehicle. The unmanned vehicle includes the battery housing apparatus in the embodiments described above.

It will be appreciated that the described embodiments are some rather than all of the embodiments of the present disclosure. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the disclosure being indicated by the following claims.

What is claimed is:

1. A battery housing apparatus, comprising: a housing body and a battery locking mechanism, wherein:
   the housing body includes a first battery compartment and a second battery compartment disposed on two opposite sides;
   the battery locking mechanism is disposed on the housing body and configured to indicate whether the battery is mounted in place during a process of mounting the battery in the battery compartment and to lock the battery in the battery compartment after the battery is mounted in place; and
   the battery locking mechanism includes:
      a locking assembly configured to be dislocated by the battery in the process of mounting the battery in the battery compartment and to be restored to lock the battery in the battery compartment after the battery is mounted in place; and
      an indicator assembly disposed on the housing body and configured to be operatively coupled with the locking assembly to indicate whether the battery is mounted in place under a control of the locking assembly, wherein:
      the locking assembly includes a first locking assembly corresponding to the first battery compartment and a second locking assembly corresponding to the second battery compartment;
      the indicator assembly includes a first key assembly and a second key assembly enclosing with each other;
      the first key assembly cooperatively couples with the first locking assembly to indicate whether the battery is mounted in place in the first battery compartment under a control of the first locking assembly;
      the second key assembly cooperatively couples with the second locking assembly to indicate whether the battery is mounted in place in the second battery compartment under a control of the second locking assembly; and
      each key assembly further controls the corresponding locking assembly to unlock the battery to allow the battery to be taken out of the battery compartment.

2. The apparatus of claim 1, wherein:
   when the first locking assembly is dislocated or restored, the first key assembly is placed at different heights relative to the housing body;
   the indicator assembly further includes a key spring;
   when the first locking assembly is dislocated by the battery, the first key assembly is restored by an elastic force of the key spring;
   when the first locking assembly is restored, the first locking assembly overcomes the elastic force of the key spring to dislocate the first key assembly, such that the first key assembly is placed at a different height relative to the housing body;

the first key assembly connects with the first locking assembly; and when the first locking assembly is dislocated or restored, the first locking assembly drives the first key assembly to different heights relative to the housing body.

3. The apparatus of claim 1, wherein:

the locking assembly includes a locking slider, a slider spring, and a slider bracket;

in the process of mounting the battery in the battery compartment, the battery overcomes an elastic force of the slider spring to dislocate the locking slider;

after the battery is mounted in place, the locking slider is restored by the elastic force of the slider spring to lock the battery in the battery compartment;

the slider bracket is fixed in the battery compartment; and the locking slider is supported on the slider bracket by the elastic force of the slider spring.

4. The apparatus of claim 3, wherein:

the locking assembly further includes a slider blocker;

the slider blocker is fixed to the slider bracket; and the locking slider is disposed between the slider blocker and the slider bracket to confine the locking slider to move in a dislocation direction.

5. The apparatus of claim 1, wherein:

the indicator assembly further includes an indicator bracket;

the indicator bracket is fixed to the housing body; and the indicator bracket, the first key assembly, and the second key assembly are sequentially nested.

6. The apparatus of claim 5, wherein:

a rotation-limiting mechanism is configured between the indicator bracket and the first key assembly or between the first key assembly and the second key assembly.

7. The apparatus of claim 5, wherein:

the first key assembly includes a first key and a first key lock;

the second key assembly includes a second key and a second key lock;

the first key includes a first cylinder and a first fixing portion disposed on one end of the first cylinder;

the second key includes a second cylinder and a second fixing portion disposed on one end of the second cylinder;

the indicator bracket, the first cylinder, and the second cylinder are enclosed with each other;

the first key lock is connected between the first fixing portion and the first locking assembly;

when the first locking assembly is dislocated and restored, the first locking assembly drives the first key assembly to different heights relative to the housing body;

the second key lock is connected between the second fixing portion and the second locking assembly; and when the second locking assembly is dislocated and restored, the second locking assembly drives the second key assembly to different heights relative to the housing body.

8. The apparatus of claim 7, wherein:

the indicator bracket couples with the first cylinder by a D-shaped cross-section in a direction vertical to an axis direction to prevent the first cylinder from rotating relative to the indicator bracket.

9. The apparatus of claim 7, wherein:

at least one rotation-limiting rib is configured on the first key lock and the second key, respectively; and the at least one rotation-limiting rib on the first key lock misaligns with the at least one rotation-limiting rib on the second key lock to prevent the second cylinder from rotating relative to the first cylinder.

10. The apparatus of claim 5, wherein:

the first key assembly includes a first key and a first key lock;

the second key assembly includes a second key and a second key lock;

the first key lock includes a first cylinder and a first extension disposed on a first end of the first cylinder;

the second key lock includes a second cylinder and a second extension disposed on a first end of the second cylinder;

the indicator bracket, the first cylinder, and the second cylinder are enclosed with each other;

the first key is fixed to a second end of the first cylinder;

the second key is fixed to a second end of the second cylinder;

the second key is enclosed in the first key; and the first extension and the second extension extend toward two opposite sides of the indicator bracket, and contact with the first locking assembly and the second locking assembly respectively when the first locking assembly and the second locking assembly are restored.

11. The apparatus of claim 10, wherein:

the first cylinder connects to the first key by screw threads; and the second cylinder fixedly connects to the second key by a screw inserted into one of the first end and the second end of the second cylinder.

12. The apparatus of claim 10, wherein:

a first receiving hole and a second receiving hole are configured on the indicator bracket;

the indicator assembly further includes a first lock pin, a first key spring, a first threaded stud, a second lock pin, a second key spring, and a second threaded stud;

the first lock pin and the first key spring are locked in the first receiving hole by the first threaded stud, such that the first lock pin elastically acts on the first extension;

when the first locking assembly is dislocated, the first lock pin drives the first key assembly to restore;

when the first locking assembly is restored, the first locking assembly overcomes an elastic force of the first key spring to dislocate the first key assembly;

the second lock pin and the second key spring are locked in the second receiving hole by the second threaded stud, such that second lock pin elastically acts on the second extension;

when the second locking assembly is dislocated, the second lock pin drives the second key assembly to restore; and when the second locking assembly is restored, the second locking assembly overcomes an elastic force of the second key spring to dislocate the second key assembly.

13. The apparatus of claim 10, wherein:

the indicator assembly further includes at least one limiting key; and the at least one limiting key is configured between the indicator bracket and the first cylinder or between the first cylinder and the second cylinder to prevent the first cylinder from rotating relative to the indicator bracket or the second cylinder from rotating relative to the first cylinder.

14. The apparatus of claim 13, wherein:

the at least one limiting key includes a first limiting key and a second limiting key;

the first limiting key is disposed between the indicator bracket and the first cylinder to prevent the first cylinder from rotating relative to the indicator bracket; and
the second limiting key is disposed between the first cylinder and the second cylinder to prevent the second cylinder from rotating relative to the first cylinder.

15. A battery housing apparatus, comprising:
a housing body and a battery locking mechanism, wherein:
  the housing body is configured with at least one battery compartment for housing a battery;
  the battery locking mechanism is disposed on the housing body and configured to indicate whether the battery is mounted in place during a process of mounting the battery in the battery compartment and to lock the battery in the battery compartment after the battery is mounted in place; and
  the battery locking mechanism includes:
    a locking assembly configured to be dislocated by the battery in the process of mounting the battery in the battery compartment and to be restored to lock the battery in the battery compartment after the battery is mounted in place; and
    an indicator assembly disposed on the housing body and configured to be operatively coupled with the locking assembly to indicate whether the battery is mounted in place under a control of the locking assembly, wherein:
      the locking assembly includes a locking slider, a slider spring, and a slider bracket;
      in the process of mounting the battery in the battery compartment, the battery overcomes an elastic force of the slider spring to dislocate the locking slider;
      after the battery is mounted in place, the locking slider is restored by the elastic force of the slider spring to lock the battery in the battery compartment;
      the slider bracket is fixed in the battery compartment;
      the locking slider is supported on the slider bracket by the elastic force of the slider spring;
      the slider bracket is fixed to an inner bottom of the battery compartment;
      a first guide slot coupling with a first guide rail on the battery and a first open slot connected to the first guide slot are disposed on the slider bracket and extend in a direction of inserting the battery;
      the locking slider is disposed on a side of the slider bracket facing away from the inner bottom of the battery compartment, and is partially exposed in the first guide slot through the first open slot; and
      the first guide rail inserts into the first guide slot to dislocate the locking slider during the process of mounting the battery in the battery compartment.

16. The apparatus of claim 15, wherein:
a second guide rail or a second guide slot is configured on a side wall of the battery compartment to extend in the direction of the battery insertion; and
the second guide rail or the second guide slot configured on the housing body is used to couple with a second guide slot or a second guide rail on the battery to lock the battery in a direction perpendicular to the bottom of the battery compartment.

17. The apparatus of claim 15, wherein:
a locking portion is configured on a side of the locking slider adjacent to the slider bracket;
the locking portion is exposed in the first guide slot through the first open slot;
a second open slot and a first fixing post adjacent to the second open slot are configured on the locking slider;
an extension portion is configured on the slider bracket at a same side with the locking slider;
the extension portion inserts into the second open slot;
a second fixing post is configured on the extension portion to extend toward the first fixing post; and
two ends of the slider spring are configured to sleeve on the first fixing post and the second fixing post, respectively, such that the locking slider is elastically supported on the slider bracket.

18. The apparatus of claim 17, wherein:
a dislocation direction is perpendicular to the direction of the battery insertion;
the locking portion includes a guide surface disposed on a side of the locking portion facing toward the direction of the battery insertion to guide the first guide rail, and a locking surface disposed on a side of the locking portion facing away from the direction of the battery insertion to lock the first guide rail; and
when the battery is mounted in place, the locking portion locks the battery in the direction of the battery insertion.

* * * * *